(12) United States Patent
Zhou et al.

(10) Patent No.: US 10,914,684 B2
(45) Date of Patent: Feb. 9, 2021

(54) IN-SITU PHOTOCATALYSIS MONITORING SYSTEM BASED ON SURFACE-ENHANCED RAMAN SCATTERING SPECTROSCOPY

(71) Applicant: DONGGUAN UNIVERSITY OF TECHNOLOGY, Guangdong (CN)

(72) Inventors: Fei Zhou, Guangdong (CN); Ye Liu, Guangdong (CN); Dongxiong Ling, Guangdong (CN); Hongcheng Wang, Guangdong (CN)

(73) Assignee: DONGGUAN UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/976,757

(22) PCT Filed: May 24, 2019

(86) PCT No.: PCT/CN2019/088361
§ 371 (c)(1),
(2) Date: Aug. 30, 2020

(87) PCT Pub. No.: WO2020/098243
PCT Pub. Date: May 22, 2020

(65) Prior Publication Data
US 2020/0408693 A1 Dec. 31, 2020

(30) Foreign Application Priority Data
Nov. 14, 2018 (CN) .......................... 2018 1 1350850

(51) Int. Cl.
*G01N 21/65* (2006.01)
*G01J 3/44* (2006.01)
(Continued)

(52) U.S. Cl.
CPC .......... *G01N 21/658* (2013.01); *B01J 19/123* (2013.01); *G01J 3/44* (2013.01);
(Continued)

(58) Field of Classification Search
None
See application file for complete search history.

(56) References Cited

U.S. PATENT DOCUMENTS

| 5,304,492 A | 4/1994 | Klinkhammer |
| 6,623,977 B1 * | 9/2003 | Farquharson ........ G01N 21/658 356/301 |

(Continued)

FOREIGN PATENT DOCUMENTS

| CN | 201110831 Y | 9/2008 |
| CN | 101403697 A | 4/2009 |

(Continued)

OTHER PUBLICATIONS

International Search Report (with English translation) dated Aug. 7, 2019 for corresponding International Application No. PCT/CN2019/088361, 8 pages.

(Continued)

*Primary Examiner* — Neil N Turk
(74) *Attorney, Agent, or Firm* — MH2 Technology Law Group, LLP

(57) ABSTRACT

An in-situ photocatalysis monitoring system based on surface-enhanced Raman Scattering (SERS) spectroscopy. The monitoring system may include a Raman excitation light source, a laser coupling lens, a narrow band filter, a total reflection mirror, a dichroic mirror, a focusing coupling lens, a SERS optical fiber probe, a liquid phase photocatalysis reactor, a photocatalytic light source, a Raman collection lens, and a spectrometer. A first furcation part and a second furcation part each extend from one end of a common detection part of the SERS optical fiber probe; an extending end of the first furcation part is coupled with the focusing coupling lens; an extending end of the second furcation part is coupled with the photocatalytic light source; and the other end of the common detection part is arranged inside the (Continued)

liquid phase photocatalysis reactor. Raman excitation light and photocatalytic light may be transmitted on a common channel.

10 Claims, 1 Drawing Sheet

(51) Int. Cl.
- *B01J 35/00* (2006.01)
- *B01J 19/12* (2006.01)
- *G02B 27/14* (2006.01)
- *G02B 5/20* (2006.01)

(52) U.S. Cl.
CPC .............. *G01N 21/65* (2013.01); *B01J 35/004* (2013.01); *C02F 2305/10* (2013.01); *G01N 2201/062* (2013.01); *G01N 2201/0633* (2013.01); *G01N 2201/0636* (2013.01); *G01N 2201/06113* (2013.01); *G01N 2201/08* (2013.01); *G02B 5/20* (2013.01); *G02B 27/141* (2013.01)

(56) References Cited

U.S. PATENT DOCUMENTS

| | | |
|---|---|---|
| 2005/0151971 A1 | 7/2005 | Tabacco et al. |
| 2009/0294692 A1* | 12/2009 | Bourke, Jr. ............ A61L 2/088 250/459.1 |
| 2018/0038798 A1 | 2/2018 | Zhang et al. |

FOREIGN PATENT DOCUMENTS

| | | |
|---|---|---|
| CN | 101713738 A | 5/2010 |
| CN | 101865829 A | 10/2010 |
| CN | 102095719 A | 6/2011 |
| CN | 104614360 A | 5/2015 |
| CN | 105954256 A | 9/2016 |
| CN | 105973807 A | 9/2016 |
| CN | 106290300 A | 1/2017 |
| CN | 106323940 A | 1/2017 |
| CN | 106645550 A | 5/2017 |
| CN | 106770028 A | 5/2017 |
| CN | 107748158 A | 3/2018 |
| CN | 207351907 U | 5/2018 |
| CN | 108613980 A | 10/2018 |
| CN | 109444106 A | 3/2019 |
| EP | 2286916 A1 | 2/2011 |

OTHER PUBLICATIONS

Chinese First Office Action (with English translation) issued in corresponding Chinese Patent Application No. 201811350850.9 dated May 31, 2019, 19 pages.

Chinese Second Office Action (with English translation) issued in corresponding Chinese Patent Application No. 201811350850.9 dated Jul. 18, 2019, 24 pages.

Chinese Notification to Grant (with English translation) issued in corresponding Chinese Patent Application No. 201811350850.9 dated Sep. 24, 2019, 3 pages.

First Search issued in corresponding Chinese Patent Application No. 201811350850.9 dated May 22, 2019, 3 pages.

EPO Global Dossier List of Documents with Dates (https://register.epo.org/ipfwretrieve?apn=CN.201811350850.A&lng=en) for Chinese Patent Application No. 201811350850.9, 1 page.

* cited by examiner

IN-SITU PHOTOCATALYSIS MONITORING SYSTEM BASED ON SURFACE-ENHANCED RAMAN SCATTERING SPECTROSCOPY

CROSS-REFERENCE TO RELATED APPLICATIONS

This application is the U.S. National Phase of PCT International Application No. PCT/CN2019/088361, filed on May 24, 2019, which claims priority to CN Patent Application No. 201811350850.9, filed in China on Nov. 14, 2018, both of which are hereby expressly incorporated by reference into the present application.

TECHNICAL FIELD

The present invention relates to the in-situ photocatalysis monitoring field, and in particular, to an in-situ photocatalysis monitoring system based on surface-enhanced Raman Scattering (SERS) spectroscopy.

BACKGROUND

A photocatalytic chemical reaction is a type of chemical reaction accelerated by a photocatalytic material (such as TiO2) conducted under irradiation of ultraviolet or visible light, for example, photocatalytic hydrolysis for hydrogen production or photocatalytic degradation of organic compounds, and has important applications in the energy field, the environment field, and the like. A photocatalytic reaction mechanism and photocatalyst selection have important influence on a speed, efficiency, and the like of the chemical reaction. Dynamic monitoring on a photocatalytic chemical reaction process is premise for understanding the photocatalytic reaction mechanism and designing an efficient photocatalyst, and therefore has become a current research hotspot.

Photocatalytic chemical reactions include multiple reaction phases such as a solid phase, a liquid phase, and a gas phase, and a liquid phase photocatalytic chemical reaction is a type of photocatalytic chemical reaction more studied and relatively widely applied currently. In recent years, monitoring of a liquid phase photocatalytic chemical reaction process by using a surface-enhanced Raman Scattering (SERS) technology has attracted extensive attention from researchers. Currently, the prior art for monitoring the liquid phase photocatalytic chemical reaction process by using SERS mainly includes the following two methods:

1. In each of different stages of the photocatalytic reaction process, a part of reaction liquid is taken out, dropped onto a surface of a solid SERS substrate, dried, and subjected to SERS detection by using a Raman spectrometer. With this discrete point sampling detection method, it is usually difficult to traverse the entire reaction process, meanwhile, the operation process is complex, and the detection error is relatively large.

2. A microreactor is used, a solid SERS substrate is placed at the bottom of the microreactor, a thin layer of reaction liquid is covered on a surface of the solid SERS substrate, and the microreactor is placed at a focus of a Raman spectrometer, so as to implement SERS spectrum detection. In this in-situ Raman monitoring method, because the thin layer of reaction liquid on the surface of the solid SERS substrate is volatile under irradiation of Raman excitation light, a concentration of the reaction liquid changes, thereby affecting accuracy of the monitoring process.

In the foregoing two methods, because an incident light path of a photocatalytic light source and a Raman excitation light path do not overlap with each other, to implement monitoring of a photocatalysis process, focus points of light on the two paths need to be adjusted to overlap with each other. This not only greatly increases experiment difficulty, but also causes a monitoring error resulting from misalignment of focus points.

SUMMARY

An objective of the present invention, among others, is to provide an in-situ photocatalysis monitoring system based on surface-enhanced Raman Scattering (SERS) spectroscopy. Raman excitation light and photocatalytic light can transmit on a same path and during photocatalysis monitoring, focus points do not need to be adjusted to overlap with each other. This not only greatly reduces experiment difficulty, but also can effectively avoid a monitoring error resulting from misalignment of focus points, thereby effectively improving accuracy of Raman dynamic monitoring. The monitoring system has a compact structure and good portability.

To achieve the above purpose, various embodiments of the present invention provide the following technical solution.

An in-situ photocatalysis monitoring system based on SERS spectroscopy includes a Raman excitation light source, a laser coupling lens, a narrow band filter, a total reflection mirror, a dichroic mirror, a focusing coupling lens, a SERS optical fiber probe, a liquid phase photocatalysis reactor, a photocatalytic light source, a Raman collection lens, and a spectrometer; where the SERS optical fiber probe includes a common detection part, and a first furcation part and a second furcation part each extend from one end of the common detection part; and the Raman excitation light source is connected to the laser coupling lens through an input optical fiber; the narrow band filter is arranged on a transmission light path of the laser coupling lens; the total reflection mirror is arranged on a transmission light path of the narrow band filter; the dichroic mirror is arranged on a reflected light path of the total reflection mirror, and the dichroic mirror is arranged in parallel to the total reflection mirror; the focusing coupling lens is arranged on a reflected light path of the dichroic mirror; an extending end of the first furcation part is coupled with the focusing coupling lens; an extending end of the second furcation part is coupled with the photocatalytic light source; the other end of the common detection part is arranged inside the liquid phase photocatalysis reactor; and the Raman collection lens is arranged on a transmission light path of the dichroic mirror, and an emission end of the Raman collection lens is coupled with the spectrometer through an output optical fiber.

Optionally, the in-situ photocatalysis monitoring system further includes a long-pass filter arranged between the Raman collection lens and the dichroic mirror, and the long-pass filter is configured to filter Raman excitation light, penetrating through the dichroic mirror, emitted by the Raman excitation light source.

Optionally, the in-situ photocatalysis monitoring system further includes a band-stop filter arranged between the Raman collection lens and the dichroic mirror; a central wavelength of the band-stop filter is equal to a wavelength of the photocatalytic light source; and the band-stop filter is configured to filter photocatalytic light, penetrating through the dichroic mirror, emitted by the photocatalytic light source.

Optionally, the in-situ photocatalysis monitoring system further includes a long-pass filter and a band-stop filter that are arranged between the Raman collection lens and the dichroic mirror in sequence; the long-pass filter is configured to filter Raman excitation light, penetrating through the dichroic mirror, emitted by the Raman excitation light source; and the band-stop filter is configured to filter photocatalytic light, penetrating through the dichroic mirror, emitted by the photocatalytic light source.

Optionally, an inclined angle between an optical axis of an incident light path of the total reflection mirror and the total reflection mirror is 45°.

Optionally, the Raman excitation light source is directly connected to a light incident end of the input optical fiber through an FC/PC fiber interface or an FC/APC fiber interface, and a light emergence end of the input optical fiber is arranged at a focus of incident light of the laser coupling lens.

Optionally, a light incident end of the output optical fiber is placed at a focus of emergent light of the Raman collection lens, and a light emergence end of the output optical fiber is connected to the spectrometer through an SMA905 fiber interface.

Optionally, a SERS sensing unit is arranged at an end, arranged inside the liquid phase photocatalysis reactor, of the common detection part, and the SERS sensing unit is of a precious metal nano-structure.

Optionally, the precious metal nano-structure includes at least one of a gold nano-structure and a silver nano-structure.

Optionally, an optical fiber of the SERS optical fiber probe is a Y-shaped optical fiber or a bifurcated optical fiber bundle.

According to specific embodiments provided in the present invention, the present invention may disclose the following technical effects.

The in-situ photocatalysis monitoring system based on SERS spectroscopy provided in embodiments of the present invention includes a Raman excitation light source, a laser coupling lens, a narrow band filter, a total reflection mirror, a dichroic mirror, a focusing coupling lens, a SERS optical fiber probe, a liquid phase photocatalysis reactor, a photocatalytic light source, a Raman collection lens, and a spectrometer. The SERS optical fiber probe includes a common detection part, a first furcation part, and a second furcation part. One end of the common detection part, one end of the first furcation part, and one end of the second furcation part are connected; the other end of the first furcation part is coupled with the focusing coupling lens on a Raman excitation light path; the other end of the second furcation part is coupled with the photocatalytic light source; and the other end of the common detection part is arranged inside the liquid phase photocatalysis reactor, so as to implement that an incident light path of the photocatalytic light source and a Raman excitation light path overlap with each other. Because Raman excitation light and photocatalytic light can transmit on the common channel, a problem in the prior art that it is difficult to overlap focus points caused because light paths do not overlap with each other can be effectively avoided, and during photocatalysis monitoring, focus points do not need to be adjusted to overlap with each other. This not only greatly reduces experiment difficulty, but also can effectively avoid a monitoring error resulting from misalignment of focus points, thereby effectively improving accuracy of Raman dynamic monitoring. The monitoring system has a compact structure and good portability.

In various embodiments of the present invention, a waveguide-type SERS optical fiber probe is directly immersed in the liquid phase photocatalysis reactor, so as to implement in-situ real-time monitoring of an SERS spectrum in a photocatalysis process, avoiding a problem in a current in-situ Raman monitoring technology that a concentration of reaction liquid changes because a thin layer of liquid volatilizes, thereby improving accuracy of Raman dynamic monitoring.

BRIEF DESCRIPTION OF DRAWINGS

Embodiments of the present invention are further described in detail with reference to the accompanying drawings.

DETAILED DESCRIPTION

The following describes the technical solutions in the embodiments of the present invention in detail with reference to the accompanying drawings in the embodiments of the present invention. Apparently, the described embodiments are merely a part rather than all of the embodiments of the present invention. All other embodiments obtained by a person of ordinary skill in the art without creative efforts on the basis of the embodiments of the present invention shall fall within the protection scope of the present invention.

An objective of the present invention, among others, is to provide an in-situ photocatalysis monitoring system based on SERS spectroscopy. Raman excitation light and photocatalytic light can transmit on the same path, and during photocatalysis monitoring, focus points do not need to be adjusted to overlap with each other. This not only greatly reduces experiment difficulty, but also can effectively avoid a monitoring error resulting from misalignment of focus points, thereby effectively improving accuracy of Raman dynamic monitoring. The monitoring system has a compact structure and good portability.

In order to make the above objects, features, and advantages of the present invention more apparent, embodiments of the present invention are further described in detail with reference to the accompanying drawings and specific implementations.

Figure 1:
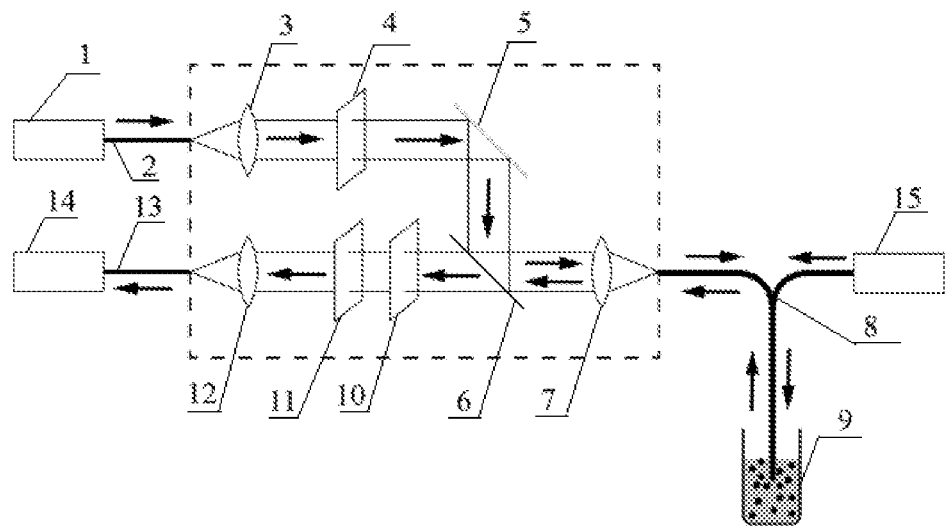
FIG. 1 is a schematic structural diagram of an in-situ photocatalysis monitoring system based on SERS spectroscopy according to an embodiment of the present invention.
Figure 2:
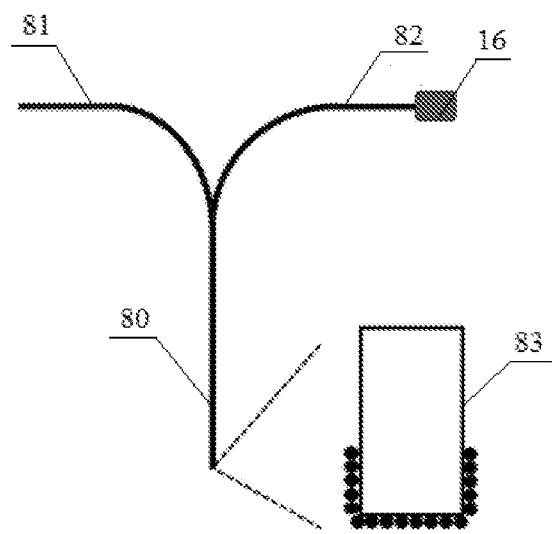
FIG. 2 is a schematic structural diagram of a SERS optical fiber probe according to an embodiment of the present invention.

FIG. 1 is a schematic structural diagram of an in-situ photocatalysis monitoring system based on SERS spectroscopy according to an embodiment of the present invention. FIG. 2 is a schematic structural diagram of a SERS optical fiber probe according to an embodiment of the present invention. As shown in FIG. 1 and FIG. 2, the in-situ photocatalysis monitoring system based on the SERS spectroscopy is provided, where the in-situ photocatalysis monitoring system includes a Raman excitation light path, a Raman collection light path, and a photocatalytic light path. The Raman excitation light path includes a Raman excitation light source 1, an input optical fiber 2, a laser coupling lens 3, a narrow band filter 4, a total reflection mirror 5, a dichroic mirror 6, a focusing coupling lens 7, a SERS optical fiber probe 8, a liquid phase photocatalytic reaction system 9. The Raman collection light path includes the SERS optical fiber probe 8, the focusing coupling lens 7, the dichroic mirror 6, a band-stop filter 10, a long-pass filter 11, a Raman collection lens 12, an output optical fiber 13, and a spectrometer 14. The photocatalytic light path includes a photocatalytic light source 15, the SERS optical fiber probe 8, and the liquid phase photocatalytic reaction system 9.

The SERS optical fiber probe 8 includes a common detection part 80, and a first furcation part 81 and a second furcation part 82 each extend from one end of the common detection part 80.

The Raman excitation light source 1 is connected to the laser coupling lens 3 through the input optical fiber 2. Specifically, the Raman excitation light source 1 is directly connected to a light incident end of the input optical fiber 2 through an FC/PC fiber interface or an FC/APC fiber interface, and a light emergence end of the input optical fiber 2 is arranged at a focus of incident light of the laser coupling lens 3. The laser coupling lens 3 is configured to change a laser emitted from the input optical fiber into parallel light. The narrow band filter 4 is arranged on a transmission light path of the laser coupling lens 3, that is, the narrow band filter 4 is placed behind the laser coupling lens 3; and is configured to conduct spatial filtering on a laser penetrating through the laser coupling lens 3, to increase a side-mode suppression ratio of Raman excitation light. The total reflection mirror 5 is arranged on a transmission light path of the narrow band filter 4, the dichroic mirror 6 is arranged on a reflected light path of the total reflection mirror 5, and the dichroic mirror 6 is arranged in parallel to the total reflection mirror 5. An inclined angle between an optical axis of an incident light path of the total reflection mirror 5 and the total reflection mirror 5 is 45°. The focusing coupling lens 7 is arranged on a reflected light path of the dichroic mirror 6. An extending end of the first furcation part 81 of the SERS optical fiber probe 8 is placed at a back focus of the focusing coupling lens 7, and is coupled with the focusing coupling lens 7; an extending end of the second furcation part 82 is coupled with the photocatalytic light source 15 through a fiber interface 16 such as an FC/PC fiber interface or an SMA905 fiber interface. The other end of the common detection part 81 is arranged inside the liquid phase photocatalysis reactor 9 for conducting dynamic monitoring of an SERS spectrum. Raman excitation light passing through the narrow band filter 4 is vertically incident to the focusing coupling lens 7 after being successively reflected by the total reflection mirror 5 and the dichroic mirror 6, and is coupled by the focusing coupling lens 7 to the SERS optical fiber probe 8. In this embodiment, an optical fiber of the SERS optical fiber probe 8 may be a Y-shaped optical fiber or a bifurcated optical fiber bundle, and a structure of a Y-shaped SERS optical fiber probe is shown in FIG. 2. The Raman collection lens 12 is arranged on a transmission light path of the dichroic mirror 6, and an emission end of the Raman collection lens 12 is coupled with the spectrometer 14 through the output optical fiber 13.

Preferably, the in-situ photocatalysis monitoring system further includes a band-stop filter 10 arranged between the Raman collection lens 12 and the dichroic mirror 6; a central wavelength of the band-stop filter 10 is equal to a wavelength of the photocatalytic light source 15; and the band-stop filter 10 is configured to filter photocatalytic light, penetrating through the dichroic mirror 6, emitted by the photocatalytic light source 15.

Preferably, the in-situ photocatalysis monitoring system further includes a long-pass filter 11 arranged between the Raman collection lens 12 and the dichroic mirror 6, and the long-pass filter 11 is configured to filter Raman excitation light, penetrating through the dichroic mirror 6, emitted by the Raman excitation light source.

In this embodiment, the in-situ photocatalysis monitoring system further includes a long-pass filter 11 and a band-stop filter 10 that are arranged between the Raman collection lens 12 and the dichroic mirror 6; the long-pass filter 11 is configured to filter Raman excitation light penetrating through the dichroic mirror 6; and the band-stop filter 10 is configured to filter photocatalytic light penetrating through the dichroic mirror.

An optical signal collected by the Y-shaped SERS optical fiber probe is first changed to parallel light through the focusing coupling lens 7. In addition to to-be-measured Raman signal light, an optical signal collected by the focusing coupling lens 7 further includes a small amount of Raman excitation light and photocatalytic light that are reflected backward. The Raman excitation light and the photocatalytic light are mostly reflected by the dichroic mirror 6, where penetrating Raman excitation light is filtered by the long-pass filter 11, and penetrating photocatalytic light is filtered by the band-stop filter 10 whose central wavelength is a photocatalytic light wavelength. After being split and filtered successively through the dichroic mirror 6, the band-stop filter 10, the long-pass filter 11, Raman excitation light and photocatalytic light in the optical signal emitted from the focusing coupling lens 7 can be filtered as far as possible. Finally, remaining Raman signal light is focused by the Raman collection lens 12 to the output optical fiber 13. A light incident end of the output optical fiber 13 is placed at a focus of emergent light of the Raman collection lens 12, and a light emergence end of the output optical fiber 13 is connected to the spectrometer 14 through an SMA905 fiber interface.

As shown in FIG. 2, an end, arranged inside the liquid phase photocatalysis reactor 9, of the common detection part 80 is a sensing end; the sensing end is a flat end face or a conical surface; a SERS sensing unit 83 is arranged at the sensing end; and the SERS sensing unit 83 is of a precious metal nano-structure. The precious metal nano-structure includes at least one of a gold nano-structure and a silver nano-structure. A preparation method of the sensing end may be a laser induction method, a chemical modification immobilization method, a template method, or the like.

Power, a wavelength of the photocatalytic light source 15 have relatively large influence on a speed, an intermediate product, and the like of a catalytic reaction, and monitoring of an in-situ real-time Raman spectrum can provide reliable data for mechanism study of a photocatalytic reaction. In this embodiment, parameters of the input optical fiber 2 are 105/125 μm and NA=0.22; parameters of the output optical fiber 13 are 200/225 μm and NA=0.22; and optical fiber parameters used by the Y-shaped SERS optical fiber probe 8 are 200/225 μm and NA=0.22. A central wavelength of an optical signal emitted by the Raman excitation light source 1 is 532 nm, and a line width of the optical signal is 0.1 nm. An optical signal emitted by the photocatalytic light source 15 is ultraviolet LED light or an ultraviolet laser whose wavelength is 365 nm.

An implementation process of the in-situ photocatalysis monitoring system based on SERS spectroscopy provided in this embodiment includes the following: (1) preparing a precious metal nano-structure at a sensing end of a common detection part of a Y-shaped optical fiber to form a Y-shaped SERS optical fiber probe; (2) preparing a liquid phase photocatalytic reaction system in a liquid phase photocatalysis reactor, and immersing the Y-shaped SERS optical fiber probe into the prepared liquid phase photocatalytic reaction system; (3) turning on a Raman excitation light source, and implementing effective excitation of a Raman signal of liquid nearby the Y-shaped SERS optical fiber probe by using a Raman excitation light path; (4) starting a spectrometer, setting a data storage path, and implementing effective collection of the Raman signal by using a Raman collection light path; and (5) turning on a photocatalytic light source, inducing, by using a photocatalytic light path, a sensing end of the Y-shaped SERS optical fiber probe to conduct a photocatalytic reaction, and recording a dynamic SERS spectrum of reaction liquid in the entire photocatalytic reaction by using both the Raman excitation light path and the Raman collection light path, so as to implement real-time in-situ monitoring of a photocatalytic reaction process.

In at least one embodiment of the present invention, a waveguide-type SERS optical fiber probe is directly immersed in the liquid phase photocatalytic reaction system, so as to implement in-situ real-time monitoring of an SERS spectrum in a photocatalysis process, avoiding a problem in a current in-situ Raman monitoring technology that a concentration of reaction liquid changes because a thin layer of liquid volatilizes, thereby improving accuracy of Raman dynamic monitoring. In addition, in at least one embodiment of the present invention, a Y-shaped optical fiber is used to implement common-path transmission of Raman excitation light and photocatalytic light, and a problem in the prior art that it is difficult to overlap focus points caused because light paths do not overlap with each other can be effectively avoided, thereby greatly reducing design difficulty of an in-situ photocatalysis monitoring apparatus, and facilitating construction a compact and portable in-situ photocatalysis monitoring instrument; and the photocatalysis monitoring instrument has an important application prospect in the photocatalysis research field.

The embodiments of the present invention are described in detail above with reference to the accompanying drawings, but the present invention is not limited to the above embodiments. Within the knowledge of a person of ordinary skill in the art, various variations can also be made without departing from the spirit of the present invention.

What is claimed is:

1. An in-situ photocatalysis monitoring system based on surface-enhanced Raman Scattering (SERS) spectroscopy, wherein the in-situ photocatalysis monitoring system comprises a Raman excitation light source, a laser coupling lens, a narrow band filter, a total reflection mirror, a dichroic mirror, a focusing coupling lens, a SERS optical fiber probe, a liquid phase photocatalysis reactor, a photocatalytic light source, a Raman collection lens, and a spectrometer;

the SERS optical fiber probe comprises a common detection part, and a first furcation part and a second furcation part each extending from a first end of the common detection part; and the Raman excitation light source is connected to the laser coupling lens through an input optical fiber; the narrow band filter is arranged on a transmission light path of the laser coupling lens; the total reflection mirror is arranged on a transmission light path of the narrow band filter; the dichroic mirror is arranged on a reflected light path of the total reflection mirror, and the dichroic mirror is arranged in parallel to the total reflection mirror; the focusing coupling lens is arranged on a reflected light path of the dichroic mirror; an extending end of the first furcation part is coupled with the focusing coupling lens; an extending end of the second furcation part is coupled with the photocatalytic light source; a second end of the common detection part is arranged inside the liquid phase photocatalysis reactor; and the Raman collection lens is arranged on a transmission light path of the dichroic mirror, and an emission end of the Raman collection lens is coupled with the spectrometer through an output optical fiber.

2. The in-situ photocatalysis monitoring system according to claim 1, wherein the in-situ photocatalysis monitoring system further comprises a long-pass filter arranged between the Raman collection lens and the dichroic mirror, and the long-pass filter is configured to filter Raman excitation light, penetrating through the dichroic mirror, emitted by the Raman excitation light source.

3. The in-situ photocatalysis monitoring system according to claim 1, wherein the in-situ photocatalysis monitoring system further comprises a band-stop filter arranged between the Raman collection lens and the dichroic mirror; a central wavelength of the band-stop filter is equal to a wavelength of the photocatalytic light source; and the band-stop filter is configured to filter photocatalytic light, penetrating through the dichroic mirror, emitted by the photocatalytic light source.

4. The in-situ photocatalysis monitoring system according to claim 1, wherein the in-situ photocatalysis monitoring system further comprises a band-stop filter and a long-pass filter that are arranged between the Raman collection lens and the dichroic mirror in sequence; the long-pass filter is configured to filter Raman excitation light, penetrating through the dichroic mirror, emitted by the Raman excitation light source; and the band-stop filter is configured to filter photocatalytic light, penetrating through the dichroic mirror, emitted by the photocatalytic light source.

5. The in-situ photocatalysis monitoring system according to claim 1, wherein an inclined angle between an optical axis of an incident light path of the total reflection mirror and the total reflection mirror is 45°.

6. The in-situ photocatalysis monitoring system according to claim 1, wherein the Raman excitation light source is directly connected to a light incident end of the input optical fiber through an FC/PC fiber interface or an FC/APC fiber interface, and a light emergence end of the input optical fiber is arranged at a focus of incident light of the laser coupling lens.

7. The in-situ photocatalysis monitoring system according to claim 1, wherein a light incident end of the output optical fiber is placed at a focus of emergent light of the Raman collection lens, and a light emergence end of the output optical fiber is connected to the spectrometer through an SMA905 fiber interface.

8. The in-situ photocatalysis monitoring system according to claim 1, wherein a SERS sensing unit is arranged at the second end of the common detection part that is arranged inside the liquid phase photocatalysis reactor, and the SERS sensing unit is of a precious metal nano-structure.

9. The in-situ photocatalysis monitoring system according to claim 8, wherein the precious metal nano-structure comprises at least one of a gold nano-structure and a silver nano-structure.

10. The in-situ photocatalysis monitoring system according to claim 1, wherein an optical fiber of the SERS optical fiber probe is a Y-shaped optical fiber or a bifurcated optical fiber bundle.

* * * * *